A. GAILLARD.
DEVICE FOR CONTROLLING THE SPEED OF AUTOMOBILE VEHICLES.
APPLICATION FILED APR. 25, 1918.
1,331,751.    Patented Feb. 24, 1920.
Fig.1.  Fig.2.
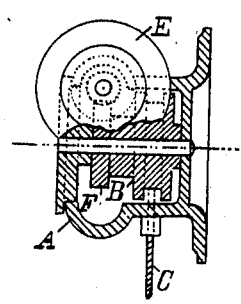
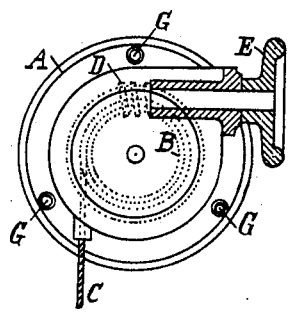
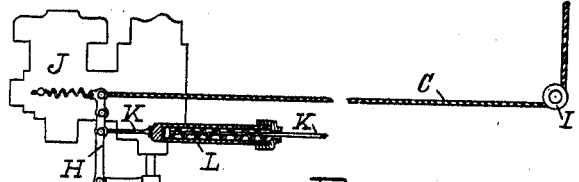
Fig.3.
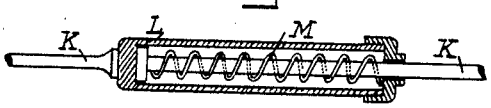
Fig.4.
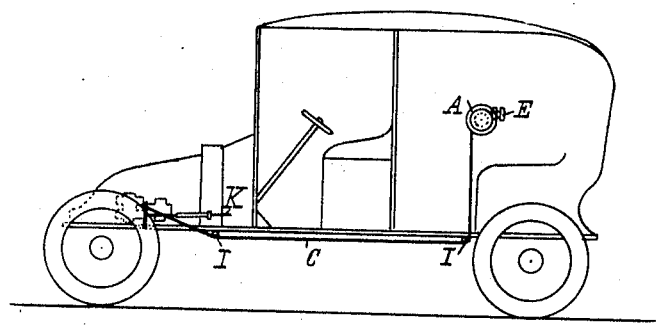
INVENTOR:
By Antoine Gaillard
Wm Wallace White
ATTY.

UNITED STATES PATENT OFFICE.

ANTOINE GAILLARD, OF MARSEILLE, FRANCE.

DEVICE FOR CONTROLLING THE SPEED OF AUTOMOBILE-VEHICLES.

1,331,751. Specification of Letters Patent. Patented Feb. 24, 1920.

Application filed April 25, 1918. Serial No. 230,784.

*To all whom it may concern:*

Be it known that I, ANTOINE GAILLARD, a citizen of France, residing at 10 Rue de la République Marseille, France, have invented new and useful Improvements in Devices for Controlling the Speed of Automobile-Vehicles, of which the following is a specification.

Under the present conditions of driving automobile vehicles the variations in the pace of a vehicle under way, depend solely at every speed, on the adjustment by the chauffeur of the members which actuate the carbureter.

Under these conditions it is necessary that the passenger, who wishes to reduce the speed of his vehicle, have recourse to orders given to the driver.

The result is, without taking into account serious accidents which are the consequence of an excessive speed, that motor car passengers are subjected, in spite of their wishes to a high speed and are powerless to reduce it, their orders being unfortunately too quickly forgotten.

According to the present invention the control by the chauffeur of the carbureter is made dependent upon its control by the passenger.

In one arrangement the control rod of the throttle valve or member connected to it is limited to one end of a Bowden cable or other like mechanical arrangement suitably mounted on the vehicle, the other end of which is connected with an operating lever enabling the passenger by the traction exerted on this cable or element to set limits to the course of the throttle in order that the chauffeur cannot, from the fact of this connection, increase the course of the member in question, that is to say increase the opening of the throttle valve or other controlling element of the carbureter beyond the predetermined limit set by the passenger and consequently increase the speed of the vehicle over a corresponding maximum.

The arrangement of the present invention is shown in the accompanying drawings by way of example:

Figure 1 is a front elevation partly in section.

Fig. 2 is a view of the apparatus as a whole.

Fig. 3 illustrates a spring sleeve connecting the divided two parts of the rod controlling the valve of the carbureter operated by the chauffeur.

Fig. 4 illustrates the arrangement placed in a motor car.

The arrangement comprises a casing A in which a small pulley B may revolve which winds up a cable C by the action of an endless screw D connected with a hand wheel E acting on a helicoidal wheel F integral with the winch B. This box A is fixed by means of screws G against the carriage body on the interior of the motor car and within reach of the passenger's hand. A pointer, placed on the axis of the winch B, may indicate on a dial or the like graduated to limiting speeds of the vehicle and it suffices to place the pointer at the speed selected to be certain that it cannot be exceeded.

A cable C, is fixed at one end to the pulley B and the other end to a lever H which controls the throttle valve or control of the carbureter. This cable may pass over small guide pulleys I placed anywhere where the cable makes a bend; it is held taut by a spring J.

The usual rod K which connects the lever H of the carbureter with the pedal operated by the chauffeur is divided into two parts connected by a sleeve L containing a spring M. The tension of this spring is regulated in such a way that when the pedal operated by the chauffeur is in the position of rest the spring does not act, nor for that matter when the chauffeur wishes to increase the speed of the vehicle up to the velocity set by the adjustment of cable by the passenger. If the chauffeur, continuing to press on the pedal, wishes to exceed the speed regulated by the passenger, the spring is compressed, the rod is elongated and the pedal descends to the bottom of its movement without acting on the lever of the carbureter which is retained by the cable.

On the other hand if the chauffeur has his foot on the pedal and the passenger desires at this moment to reduce the speed of the vehicle, he winds up the cable and the traction of this latter causes the valve of the carbureter to follow while the rod K becomes virtually longer compressing the spring M in an inverse direction and this although the pedal is at the bottom of its movement.

In order to throw the arrangement into action, it is sufficient for the passenger to turn the hand wheel E so that the pointer corresponds to the maximum speed at which he wishes to travel. The worm on the hand wheel, acts on the worm wheel on the pulley and winds up or unwinds the cable which limits the maximum speed of the vehicle without limiting the minimum speed or impeding the working of the pedal operated by the chauffeur.

Having now particularly described and ascertained the nature of my said invention and in what manner the same is to be performed, I declare that what I claim is:

1. A device of the character described, comprising a throttle valve, means operable by the driver of a vehicle for actuating the valve, and means operable by the passenger of the vehicle for limiting the opening movement of the valve, the organization being such that the driver operable means may continue to operate regardless of the operation of the passenger operable means, but without effect on the movement of the valve beyond said limit.

2. A device of the class described comprising a throttle valve, means operable by the driver of a vehicle for actuating the valve, and means operable by the passenger of a vehicle for limiting the effect of said first means, the driver operable means being so constituted that the operation thereof may be continued regardless of the operation of the passenger operable means, but without effect on the movement of the valve beyond said limit.

3. A device of the character described, comprising a throttle valve, means operable by the driver of a vehicle for actuating the valve, means operable by a passenger of the vehicle for limiting the opening movement of the valve, and means associated with said first means for rendering the same inactive to open said valve beyond a predetermined limit, comprising a rod formed of sections extensibly associated with each other and biased toward each other.

4. A device of the character described, comprising a throttle valve, means operable by the driver of a vehicle for actuating the valve, means for permitting operation of said first means throughout the range of its movement while rendering the same ineffective to open the valve beyond a predetermined limit, and means operable by the passenger of the vehicle for controlling the last mentioned means.

In testimony whereof I have signed my name to this specification in the presence of two subscribng witnesses.

ANTOINE GAILLARD.

Witnesses:
  JOHN T. MCCUTCHEON,
  JAMES P. DAVIS.